United States Patent Office 3,412,146
Patented Nov. 19, 1968

3,412,146
PROCESS FOR PREPARATION OF DIPHENYL
ALKANOIC ACIDS
William G. Kofron, Dobbs Ferry, N.Y., assignor to Geigy
Chemical Corporation, Greenburgh, N.Y., a corporation of Delaware
No Drawing. Filed Aug. 13, 1965, Ser. No. 479,664
4 Claims. (Cl. 260—515)

ABSTRACT OF THE DISCLOSURE

Acids of the formula

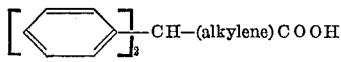

are prepared by reacting acids having the formula X—(alkylene)—COOH with at least two molar equivalents of an alkali metal diphenylmethylide. X is iodo, bromo and chloro and alkylene is a divalent branched or straight hydrocarbon chain.

---

This invention relates to the preparation of ketones useful in the synthesis of biologically-active compounds. More particularly it is concerned with the preparation of indanones, tetralones and benzsuberones, the latter two of which can be used for example as intermediates in the production of aryl-substituted-methanobenzazocines, also known as benzomorphans, and aryl-substituted-benzsuberones, respectively.

It has been known for some time that cyclic ketones are useful in the preparation of analgetics. For example, Wawzonek et al., in J. Am. Chem. Soc., 76, 1641 (1954), have outlined the preparation of 4-phenyl-1-tetralone and its conversion to amines related to the powerful analgetic, methadon. Wawzonek's et al. synthetic pathway involved first preparation of 4,4-diphenylbutyric acid by hydrogenation of 4,4-diphenylbutenoic acid, then conversion to its acid chloride and, finally, cyclization of the acid chloride to 4-phenyl-1-tetralone. Since 4,4-diphenylbutenoic acid is not a commonly available starting material, Wawzonek et al. resorted to the synthetic method of W. S. Johnson et al. in J. Am. Chem. Soc. 67, 730, (1945). Johnson et al. prepared 4,4-diphenylbutenoic acid by the potassium t-butoxide catalyzed condensation of benzophenone with diethyl succinate followed by decarbethoxylation of the β-carbethoxy-γ,γ-diphenylvinyl acetic acid formed thereby. Thus to obtain the desired tetralone from commercially available starting materials a total of five steps are needed; condensation, decarbethoxylation, catalytic reduction, conversion to an acyl halide and finally cyclization. Furthermore, the catalytic reduction step required, for good yield, the use of hydrogen pressures of 1960 pounds per square inch.

At the present state of the art, therefore, it would be desirable to provide a means to obtain cyclic ketones, especially tetralones, from readily available starting materials in fewer than five steps. It would also be desirable to provide a means to obtain the desired ketones in a manner which does not require heavy hydrogenation vessels capable of withstanding pressures of the order of about 2,000 pounds per square inch. Such a means would make it possible for industry to prepare the desired ketones on a kilogram scale, or even larger, with facility. A means to prepare ketones in only two steps from readily available starting materials, without the need for heavy and expensive reaction vessels, in kilogram quantities, is provided by the instant invention.

The method contemplated by the present invention is, in essence: a process for the preparation of ketones of the formula:

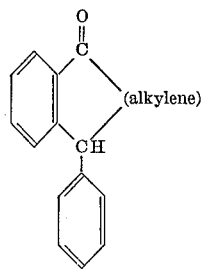

wherein alkylene is —(CH$_2$)$_n$—

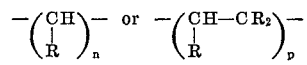

$n$ being 1 to 3 and $p$ being 1 to 2, and wherein R is hydrogen or lower alkyl, which comprises
(a) Reacting a salt of the formula X—(alkylene)—COO$^\ominus$ wherein X is bromine, chlorine or iodine with at least one molar equivalent of an alkali metal diphenylmethide until formation of an alkali metal carboxylate of the formula

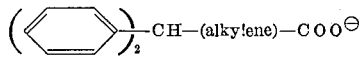

is substantially complete, acidifying the reaction mixture to obtain a diphenyl-substituted acid of the formula

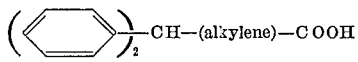

and recovering said diphenyl-substituted acid and
(b) Heating the said diphenyl-substituted acid with polyphosphoric acid until cyclization is substantially complete and recovering the ketone formed by said cyclization.

"Lower alkyl" when used herein and in the appended claims contemplates alkyl of from 1 to 6 carbon atoms, straight chain or branched.

As will be obvious to those skilled in the art, the instant process is useful also to prepare ketones bearing on the benzene rings a variety of substituents. It is only necessary to employ an appropriately substituted diphenyl methide as a starting material. Illustrative of such substituents are alkyl, alkoxyl, hydroxy, chloro and like groups.

A particularly useful embodiment of the instant invention is a process for the preparation of 4-phenyl-1-tetralone which comprises:
(a) Reacting 3-bromopropionic acid with at least 2 molar equivalents of sodium diphenylmethide until formation of sodium 4,4-diphenylbutyric acid is substantially complete, acidifying the reaction mixture to obtain 4,4-diphenylbutyric acid and recovering the said butyric acid and (b) Heating 4,4-diphenylbutyric acid with polyphosphoric acid until cyclization is substantially complete and recovering the 4-phenyl-1-tetralone formed by said cyclization.

The use of this unique embodiment in the preparation of the valuable compound 2-methyl-5-phenyl-6,7-benzomorphan-8-one is demonstrated in the following sequence (steps 1, 2 and 3):

The final compound has analgesic and CNS activity.

A further, particularly valuable embodiment of the instant invention, is a process for the preparation of 3-methyl-4-phenyl-1-tetralone which comprises:

(a) Reacting 3-bromobutyric acid with at least 2 molar equivalents of potassium diphenylmethide until formation of potassium 3-methyl-4,4-diphenylbutyrate is substantially complete, acidifying the reaction mixture to obtain 3-methyl-4,4-diphenylbutyric acid and recovering said butyric acid and (b) Heating 3-methyl-4,4-diphenylbutyric acid with polyphosphoric acid until cyclization is substantially complete and recovering the 3 - methyl - 4 - phenyl - 1-

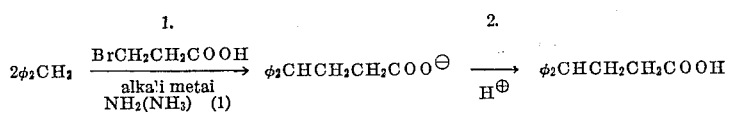

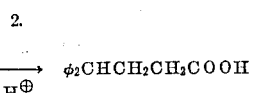

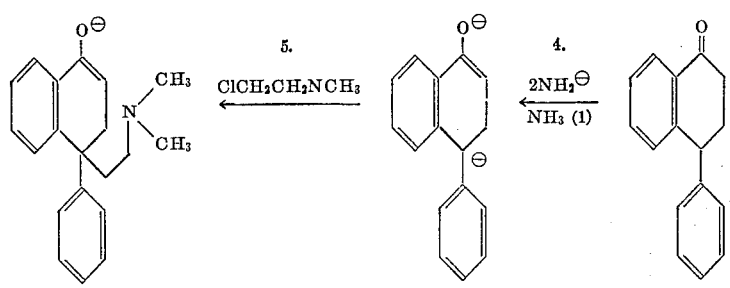

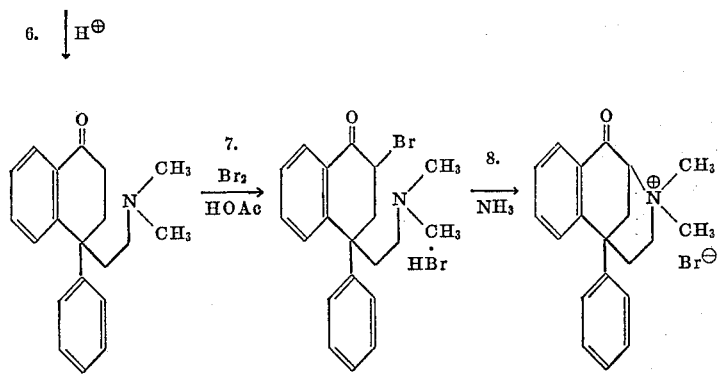

tetralone formed by said cyclization. This embodiment is outlined in the following sequence:

1.

$$2\phi_2CH_2 \xrightarrow[BrCHCH_2COOH]{\text{alkali metal } NH_2(NH_3)} \phi_2CH-CHCH_2COO^\ominus$$
$$\qquad\qquad\qquad\;\; |\qquad\qquad\qquad\qquad |$$
$$\qquad\qquad\qquad\; CH_3\qquad\qquad\qquad\quad CH_3$$

$$H^\oplus \downarrow 2.$$

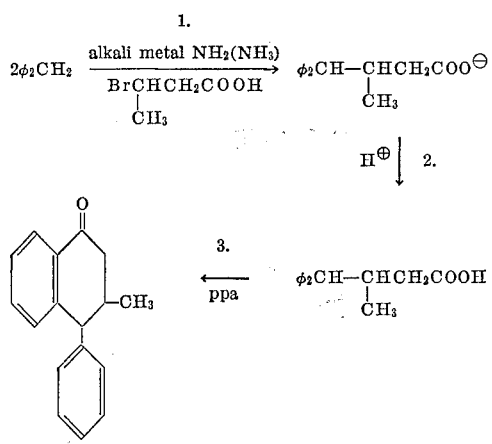

$$\xleftarrow{ppa}\; \phi_2CH-CHCH_2COOH$$
$$\qquad\qquad\qquad |$$
$$\qquad\qquad\quad CH_3$$

Following the same sequence designated in connection with 4-phenyl-1-tetralone above, the valuable compound 2,9 - dimethyl-5-phenyl-6,7-benzomorphan-8-one can be obtained. This compound has analgesic and CNS activity.

The above-mentioned embodiments are particularly valuable because prior art preparations are not at all practical for large scale syntheses. In contrast, these embodiments have been employed on a kilogram scale, with facility.

Special mention is made, in connection with the specific embodiments above, of the convenience of using one additional molar equivalent of the alkali metal diphenylmethide to furnish the required cation when an acid is used as the starting material. In some instances the acids are more readily available than the salts and instead of using at least one mole of alkali metal diphenylmethide, two are used, the desired salt being generated instantaneously in situ.

The alkali metal diphenyl methides used as starting materials in the instant processes are obtained easily by techniques well-known to those skilled in the art. For example, a solution of sodium-, potassium- or lithium amide in liquid ammonia can be treated with an equimolar amount of diphenylmethane, which is conveniently added as an ethereal solution. The desired methide starting material forms immediately, usually imparting a characteristic coloration to the solution. It is preferred to carry out the first step of the instant process by adding the appropriate halogen-substituted acid to a solution of the diphenyl methide, freshly prepared. If a free acid starting material is used, there is needed at least two molar equivalents of the alkali metal diphenyl methide, one to form the carboxylate anion, and the other to displace the halogen, chlorine, bromine or iodine. This step in the reaction is very readily completed; a convenient endpoint is to observe the discharge of the characteristic color, usually orange, of the diphenyl methide reagent. The diphenyl-substituted acid is conveniently recovered by evaporating the reaction solvent, taking up the residue in water and acidifying with a strong acid, such as hydrochloric. The product usually precipitates and is recovered in good yield by filtration. It may be purified, if necessary, by recrystallization.

The cyclization step is carried out with facility in high yield by treating the appropriate acid of the formula:

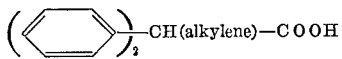

with polyphosphoric acid (Merck Index, 7th Ed., 1960, p. 833). It is convenient to add the diphenyl-substituted acid to hot polyphosphoric acid, and to stir and heat the mixture for about 30 minutes. During this time the water formed by the cyclization is substantially completely eliminated. Recovery of the product is easily achieved by causing it to precipitate by adding ice and water to the cooled reaction mixture. If desired, the ketone can be purified by recrystallization from an appropriate solid, such as ethanol.

The following examples are illustrative of the new processes of the present invention. They are not intended to be construed as limiting the scope of the claims in any manner whatsoever.

EXAMPLE I 4-phenyl-1-tetralone (A) 4,4-DIPHENYLBUTYRIC ACID

To a solution of 1 mole of sodium diphenylmethide, prepared by the addition of 168 g. (1 mole) of diphenylmethane in ether to a solution of 1 mole of sodium amide in liquid ammonia, was added an ethereal solution of 76.5 g. (0.5 mole) of 3-bromopropionic acid. The orange color of the diphenylmethide disappeared as the last of the acid was added. The ammonia was evaporated and the solid was separated by filtration and dissolved in water, and the aqueous solution was acidified with hydrochloric acid. The white precipitated acid was recrystallized from aqueous ethanol to give 96 g. (80%) of white solid, M.P. 104°.

(B) 4-PHENYL-1-TETRALONE

To 250 g. of polyphosphoric acid, heated to 125° was added 66 g. (0.275 mole) of 4,4-diphenylbutyric acid. The mixture was stirred and heated at 120–130° for 30 min. The red-brown solution was cooled and ice and water were added. The yellow precipitate was separated by filtration, stirred with dilute sodium hydroxide, washed with water and recrystallized from aqueous ethanol to give 49.5 g. (83%) of pale yellow solid, M.P. 74.5–76°.

This compound is eminently satisfactory to prepare 2-methyl-5-phenyl-6,7-benzomorphan-8-one, which in turn can be converted to 2-methyl-5-phenyl-6,7-benzomorphan, both of which have valuable analgesic properties.

EXAMPLE II 3-methyl-4-phenyl-1-tetralone (A) 3-METHYL-4,4-DIPHENYLBUTYRIC ACID

To a solution of 0.1 mole of potassium diphenylmethide in liquid ammonia, prepared from 0.1 mole of potassium amide and 16.8 g. of diphenylmethane, was added an ethereal solution of 8.35 g. (0.05 mole) of 3-bromobutyric acid. The solution was stirred until the color was discharged and the ammonia was evaporated. The residue was stirred with ether and water and the layers were separated. The aqueous solution was washed once with ether and acidified. The resulting solid acid melted at 114–115°.

(B) 3-METHYL-4-PHENYLTETRALONE

To 250 g. of polyphosphoric acid, heated to 120–130°, was added 5.08 g. of the above acid. The brown mixture was stirred and heated for 1 hour, cooled to room temperature and poured into ice-water. The mixture was extracted with ether and the ethereal solution was washed with saturated sodium bicarbonate. The ethereal solution was dried over sodium sulfate and evaporated to give 4.43 g. (95%) of tan solid, which was recrystallized from aqueous ethanol to give pale yellow needles melting at 97–98.5°.

This compound is eminently satisfactory to prepare 2,9 β-dimethyl-5-phenyl-6,7-benzomorphan-8-one and 2, 9 β-dimethyl-5-phenyl-6,7-benzomorphan, both of which have valuable analgesic properties.

EXAMPLE III 3-phenyl-1-indanone (A) 3,3-DIPHENYLPROPIONIC ACID

To a liquid ammonia solution of 0.5 mole of potassium amide is added a solution of 84 ml. (0.5 mole) of diphenylmethane in 150 ml. of ether. To the resulting deep red solution of potassium diphenylmethide is added 58.25 g. (0.5 mole) of sodium chloroacetate as a solid. A small amount of tetrahydrofuran is added to aid solubility. After addition, the color of the solution is dark red-brown and does not change, even with additional stirring. Ammonia is boiled off and ammonium chloride is added. The acidic material is extracted with 1 N NaOH, then the basic solution is acidified with 6 N HCl. The liberated product is extracted with ether and the ether is evaporated. The product is recrystallized from a mixture of ether and petroleum ether; it is a white solid and melts at 141–142.5°.

(B) 3-PHENYL-1-INDANONE

To 150 g. of polyphosphoric acid heated and stirred at 140–150° C. is added 7.0 g. of 3,3-diphenylpropionic acid. The acid melts and the solution turns dark brown. After stirring for 3 hours, the solution is allowed to cool then is poured on ice. The organic material is extracted into ether. The ether solution is washed with 1 N NaOH, then is dried over anhydrous sodium sulfate and evaporated. The desired indanone remains as a residue, 4.3 g., 67% yield.

EXAMPLE IV 5-phenylbenzsuber-1-one

The procedure of Example I is repeated substituting a stoichiometrically equivalent amount of 4-bromobutyric acid for 3-bromopropionic acid. There are obtained in good yields, respectively, 5,5-diphenylvaleric acid and 5-phenylbenzsuber-1-one.

EXAMPLE V

By the procedure of Example I substituting for the 3-bromopropionic acid stoichiometrically equivalent amounts of appropriately substituted chloro-, bromo-, or iodo-acids there are obtained the following diphenyl-substituted acids:

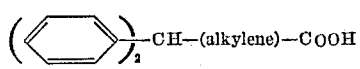

Alkylene

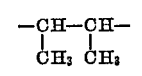

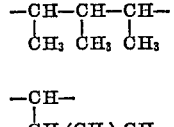

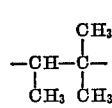

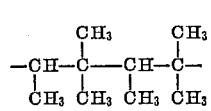

These compounds are converted with polyphosphoric acid to ketones of the structure

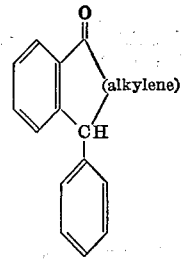

wherein "alkylene" is as designated above.

The ketones are useful to prepare compounds with valuable analgesic and CNS properties.

EXAMPLE VI 5-phenylbenzsuber-1-one (A) 5,5-DIPHENYLVALERIC ACID

To a solution of 0.1 mole of potassium diphenylmethide in 500 ml. of liquid ammonia was added an ethereal solution of 8.35 g. (0.05 mole) of 4-bromobutyric acid. The color of the diphenylmethide was discharged by the last of the bromoacid. The ammonia was evaporated and the residue stirred with ether and water, and the layers separated. The aqueous solution was acidified and extracted with ether and the extract dried and concentrated to give 8.3 g. of oily residue which crystallized on standing. After recrystallization from ether-hexane, there was obtained 5.3 g. (42%) of 5,5-diphenylvaleric acid, M.P. 92.5–93.5°.

(B) 5-PHENYLBENZSUBER-1-ONE

A solution of 5 g. of 5,5-diphenylvaleric acid in 200 g. of polyphosphoric acid was heated and stirred at 120° for three hours. The mixture was poured onto ice and the aqueous mixture extracted with two 100 ml. portions of ether. The ethereal extract was shaken with aqueous sodium bicarbonate, dried over sodium sulfate, and concentrated to give 4.6 g. (98%) of 5-phenylbenzsuber-1-one.

What is claimed is:
1. In the process for the preparation of a diphenyl alkanoic acid of the formula:

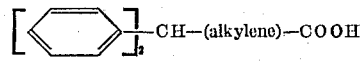

wherein alkylene

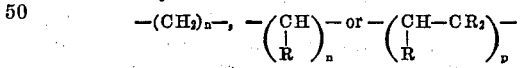

$n$ is 1 to 3, P is 1 to 2 and R is hydrogen or 1 to 6 carbon atom alkyl, the improvement comprising treating an acid of the formula:

X—(alkylene)—COOH wherein X is iodo, bromo or chloro, with at least two molar equivalents of an alkali metal diphenylmethylide.

2. The process according to claim 1 wherein the alkali metal diphenylmethylide is sodium or potassium diphenylmethylide.

3. The process according to claim 2 wherein the acid is 3-bromopropionic acid.

4. The process according to claim 2 wherein the acid is 3-bromobutyric acid.

References Cited

Auwers, Ber. Deut. Chem., 52, 110–111 (1919).
Tetenbaum et al., J. Org. Chem. 23, 229–233 (1958).
Petrov et al., Chem. Abstracts, 51, 12044f (1957).
Wawzonek et al., J. Am. Chem. Soc., 76, 1641–1643 (1954).

DANIEL D. HORWITZ, *Primary Examiner.*